United States Patent Office 2,959,728
Patented Nov. 8, 1960

2,959,728

SERIES PARALLEL CONNECTION FOR REGULATORS USING BALANCE COILS

William C. Sealey, Wauwatosa, Wis., assignor to Allis-Chalmers Manufacturing Company, Milwaukee, Wis.

Filed Aug. 15, 1956, Ser. No. 604,164

5 Claims. (Cl. 323—43.5)

This invention relates in general to step type voltage regulating apparatus and in particular to an improved arrangement for providing a selective series parallel connection for the tapped winding of a regulating apparatus.

An object of the present invention is to double the normal current rating of a step type voltage regulator without increasing the current rating of the regulator's windings.

A further object of the present invention is to provide a simple and convenient connecting arrangement which is operable to double the normal current carrying capacity of the regulator.

Figure 1:
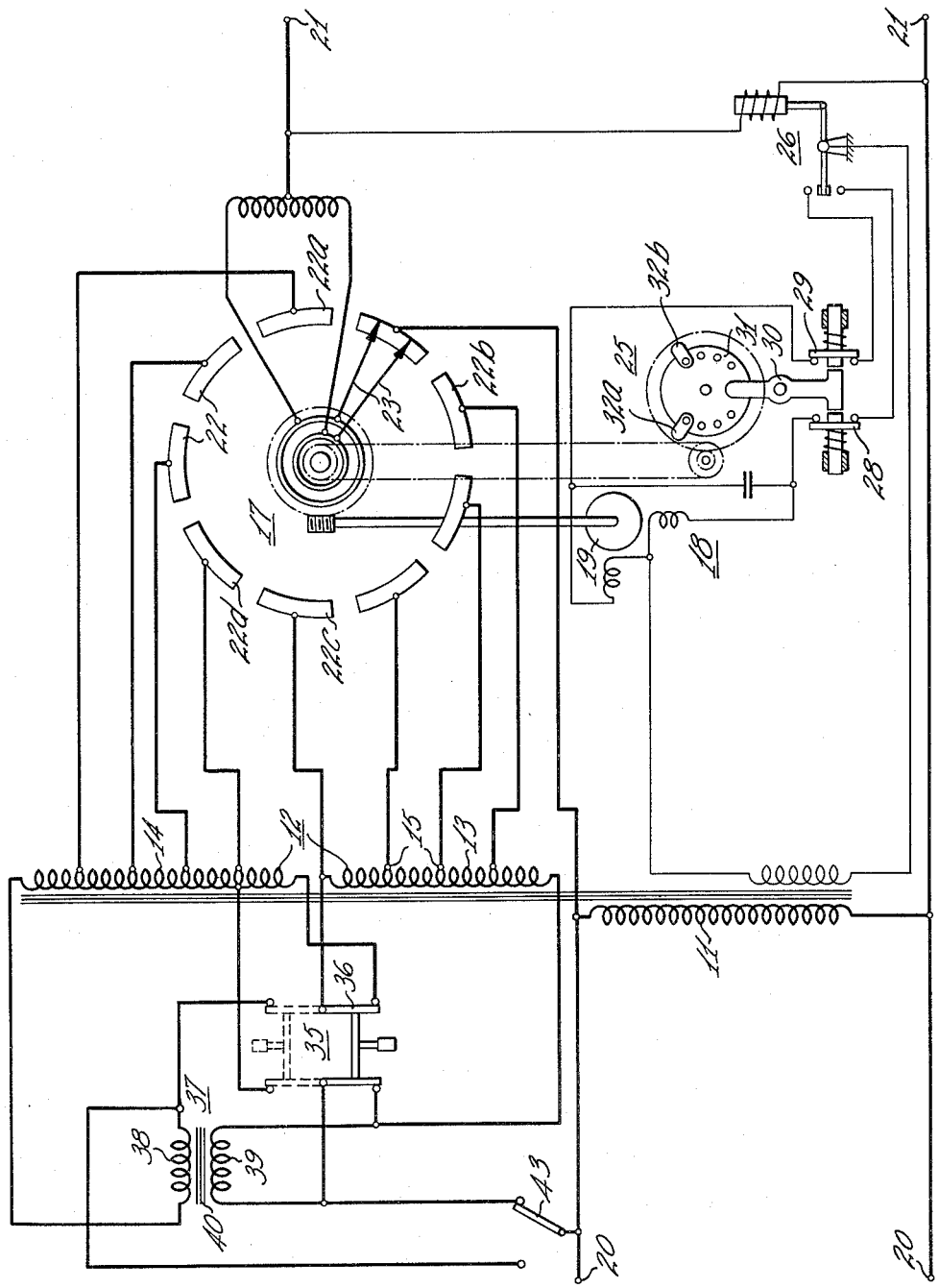
Figure 2:
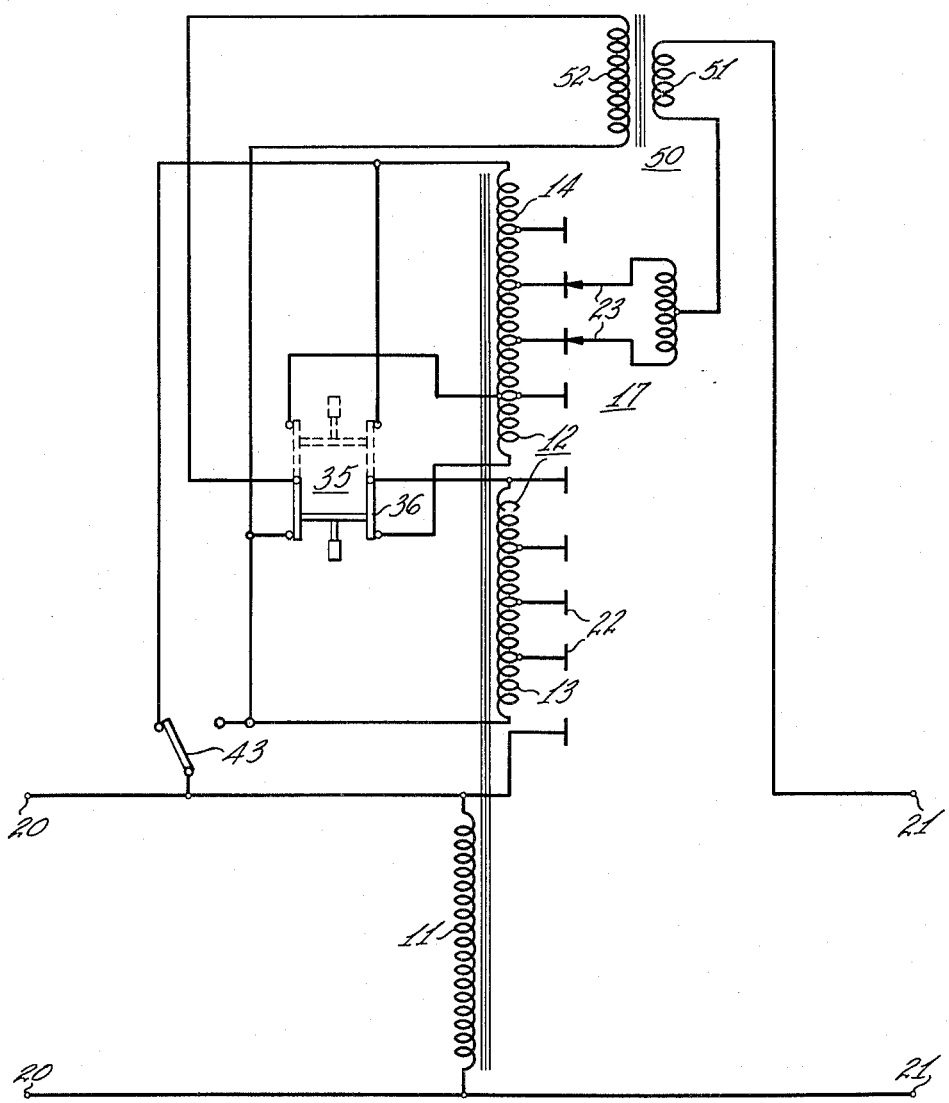

Objects and advantages other than those mentioned above will be apparent from the following description when read in connection with the drawings in which:

Fig. 1 illustrates diagrammatically a voltage regulating apparatus embodying the present invention; and Fig. 2 is a schematic illustration of a modification of the apparatus shown in Fig. 1.

Referring to the drawing and particularly to Fig. 1, the voltage regulating apparatus illustrated therein comprises an exciting winding 11, a regulating winding 12 having a first section 13 and a second section 14 each of which is provided with a plurality of electrically spaced taps 15, a motor operated tap changer 17 and a control circuit 18 for energizing the motor 19 of tap changer 17. The apparatus further includes a pair of supply terminals 20 and a pair of load terminals 21.

Exciting winding 11 is connected across supply terminals 20 and the regulating winding 13 is connected between a supply terminal 20 and a load terminal 21.

Any suitable known type of tap changer may be employed in the apparatus. As illustrated in the preferred embodiment shown in Fig. 1, the tap changer 17 is preferably of the dial type and comprises a plurality of stationary contacts 22 circumferentially spaced on an arc of a circle and connected respectively to taps 15 of winding 12. Tap changer 17 also includes a pair of movable contacts 23 which are constructed and arranged to cooperate with stationary contacts 22 so as to define operating positions for the regulator. The tap changer 17 is operated through the reversible motor 19 which may be controlled either manually or as shown automatically by a suitable control circuit 18.

Control circuit 18 comprises a condition responsive device 26 which may for example be a contact making voltmeter which measures the voltage at the output terminals 21 of the regulator or, by line drop compensation, the voltage at some point in the load circuit remote from the regulator. Device 26 operates to energize motor 19 to operate tap changer 17 causing the output voltage of the regulator to be suitably increased or decreased to correct abnormal voltage conditions in the load circuit.

Control circuit 18 further includes means 25 responsive to the position of the movable contacts of the tap changer 17 to deenergize the motor 19 independently of the operation of the condition responsive device 26. As shown this means comprises a pair of contactors 28 and 29 disposed in the motor control circuit 18, a cam member 30 mounted for pivotal movement, and a disk member 31 mounted on an axis for rotation in accordance with the movement of movable contacts 23 of tap changer 17. Disk member 31 is provided with a pair of adjustable stop members 32 which after a predetermined amount of rotation of member 31, contact cam member 30 to cause opening of either contactors 28 or 29.

In order to double the current rating of the regulating apparatus without increasing the current rating of the regulating winding 12, a connecting arrangement 35 is employed which is operable to connect sections 13 and 14 of the regulating winding 12 in parallel and to insert in this parallel circuit, means to balance the current flowing in each winding section 13 and 14. The connection arrangement 35 as shown in Fig. 1 comprises a double pole, double throw type switch means 36 and a balancing transformer 37. Balancing transformer 37 comprises two windings 38 and 39 disposed on a common core 40 with the windings disposed so that their magnetomotive forces oppose each other when sections 13 and 14 of regulating winding 12 are connected in parallel by switch means 36.

In the normal position of switch means 36, as shown in Fig. 1, sections 13 and 14 of the tapped regulator winding 12 are connected in series and one coil 39 of the balancing transformer 37 is short circuited rendering it inoperable. The regulating apparatus is thus capable of varying the output voltage by steps a predetermined percentage above the voltage applied to supply terminals 20. In order to also vary the voltage the same percentage below the supply voltage, a reversing switch 43 is employed which functions to change the polarity of the regulating winding 12 with respect to the exciting winding 11, as is well known in the art. Any suitable known type of reversing switch 43 may be employed. With switch means 36 in the position shown in Fig. 1 the apparatus is operable to vary the output voltage across terminals 21 a fixed percentage, usually ten percent above and below that supplied to input terminals 20, with the maximum load current limited by the current carrying ability of winding 12.

Tap changer 17 as shown in Fig. 1 is on the zero tap position and by being moved clockwise through alternate bridging and nonbridging positions raises the output voltage in sixteen equal steps to a maximum of ten percent above that supplied to the apparatus. The clockwise movement of the tap changer switch 11 is limited by action of the device 25 which renders the motor control circuit 18 inoperable to move contacts 23 past stationary contact 22a.

Similarly tap changer 17 by being moved counterclockwise from the position shown in Fig. 1 first operates the reversing switch 43 to reverse the polarity of winding 12 with respect to winding 11. Further counterclockwise rotation of the movable contacts 23 reduces the output voltage in sixteen equal steps to a maximum of ten percent below that supplied to the apparatus. The counterclockwise movement of contacts 23 is limited by the position of stop member 32b of device 25 which causes the motor control circuit to be rendered inoperable when movable contacts 23 are moved counterclockwise to stationary contact 22b.

In situations where additional loads are added to the output circuit of the regulator and the full plus and minus ten percent range of regulation is not needed, it is possible with the illustrated apparatus to very simply and conveniently double the current rating of the regulator. This is accomplished by operating switch means 36 to the dotted line position shown in Fig. 1 and adjusting the stop members 32 on disk member 31 so that tap changer 17 operates over a preselected tap range which is substantially half that of the range employed under normal operation. In the dotted line position of the switch means 36 sections 13 and 14 of winding 12 are connected in parallel and windings 38 and 39 of balancing transformer 37 are connected in series respectively with sections 13 and 14 of the regulating winding 12. The load current is forced to divide in equal parts by action of the balancing transformer 37 so that sections 13 and 14 carry only normal current when the load current in the load circuit is twice normal.

Stop member 32a is adjusted so that the clockwise movement of movable contacts 23 from the position shown in Fig. 1 is limited to eight voltage steps so that when both movable contacts 23 are positioned on stationary contact 22c, device 25 renders the motor circuit 18 inoperable to cause further clockwise movement of the switch. Similary stop member 32b is adjusted so that the counterclockwise movement of movable contact 23 from the position shown in Fig. 1 is also limited to eight voltage steps so that when both contacts 23 are positioned on stationary contact 22d, device 25 renders the motor control circuit 18 inoperable to cause further counterclockwise movement of the movable contacts 23.

It will thus be seen that a very simple and convenient arrangement is provided for doubling the normal current rating of the regulating apparatus.

Fig. 2 illustrates schematically a modification of the apparatus shown in Fig. 1 and is identical thereto except for the balancing transformer 50. In Fig. 2 one coil 51 of the balancing transformer 50 is inserted in series with the output circuit of the regulator and carries the load current while the other coil which has twice the number of turns as coil 51 is inserted in series circuit with one section of the regulator winding 12. Under normal operation coil 52 is short circuited by switch means 36 which renders the balancing transformer 50 inoperable. However, when it is desired to double the current carrying ability of the apparatus, switch member 36 is moved to the position to connect sections 13 and 14 in parallel and render the balancing transformer operable to cause equal current to flow in both sections. The operation of the apparatus shown in Fig. 2 is substantially the same as described with respect to Fig. 1.

While only two embodiments of the present invention have been illustrated and described it will be apparent to those skilled in the art that modifications may be made therein without departing from the spirit of the invention or from the scope of the appended claims.

What is claimed is:

1. A voltage regulating apparatus comprising in combination an exciting winding, a tapped regulating winding having first and second sections, a tap changer associated with said regulating winding for varying the voltage ratio between said exciting winding and said regulating winding, motor means for operating said tap changer in response to a predetermined condition including means responsive to a predetermined position of said tap changer to render said motor means inoperable, a reversing switch for connecting one of the ends of said tapped regulating winding to said exciting winding to fix the polarity of said tapped regulating winding with respect to said exciting winding, a balancing transformer, and switch means operable in one position to connect said winding sections in series and render said balancing transformer inoperable, and operable in a second position to connect said winding sections in parallel and said balancing transformer in circuit with said apparatus to cause an equal division of current between said parallel connected windings.

2. A voltage regulating apparatus comprising in combination an exciting winding, a tapped regulating winding having first and second sections, a tap changer associated with said regulating winding for varying the voltage ratio between said exciting winding and said regulating winding, motor means for operating said tap changer in response to a predetermined condition including means responsive to a predetermined position of said tap changer to render said motor means inoperable, a reversing switch for connecting one of the ends of said tapped regulating winding to said exciting winding to fix the polarity of said tapped regulating winding with respect to said exciting winding, a balancing transformer having first and second coils, and switch means operable in one position to connect said winding sections in series and render said balancing transformer inoperable and operable in a second position to connect said winding sections in parallel and the coils of said balancing transformer in series circuit respectively with said windings to cause an equal division of current between said parallel connected windings.

3. A voltage regulating apparatus comprising in combination an exciting winding, a tapped regulating winding having first and second sections, a tap changer associated with said regulating winding for varying the voltage ratio between said exciting winding and said regulating winding, motor means for operating said tap changer in response to a predetermined condition including means responsive to a predetermined position of said tap changer to render said motor means inoperable, a reversing switch for connecting one of the ends of said tapped regulating winding to said exciting winding to fix the polarity of said tapped regulating winding with respect to said exciting winding, a balancing transformer comprising a first coil having $n$ number of turns connected to carry the load current of said regulator and a second coil having $$\frac{n}{2}$$

number of turns connected in series circuit with one of said sections, and switch means operable in one position to connect said winding sections in series and render said balancing transformer inoperable by short circuiting said second coil and operable in a second position to connect said winding sections in parallel and said second coil in circuit to cause an equal division of current between said parallel connected windings.

4. A voltage regulating apparatus comprising in combination, an exciting winding, a regulating winding having first and second sections each of which is provided with a plurality of taps, a tap changer having a plurality of stationary contacts connected respectively to said taps and a pair of movable contacts cooperating with said stationary contacts to vary the voltage ratio between said exciting winding and said regulating winding, a reversible motor for moving said movable contacts in either of two directions, control means responsive to the output voltage of said regulator to energize said motor, means for rendering said control means inoperable in response to a predetermined position of said movable contacts, a reversing switch for connecting one of the ends of said tapped regulating winding to said exciting winding to fix the polarity of said tapped regulating winding with respect to said exciting winding, a balancing transformer having a first coil connected in series circuit with said first section and a second coil connectable in series circuit with said second section, a double pole double throw type switch operable in one position to connect said sections in series and short circuit said first coil, and operable in another position to connect said sections in parallel and said coils in series respectively with said sections whereby the load current of said apparatus is caused to divide equally between said parallel connected sections.

5. A voltage regulating apparatus comprising in combination an exciting winding, a regulating winding having first and second sections each of which is provided with a plurality of taps, a tape changer having a plurality of stationary contacts connected respectively to said taps and a pair of movable contacts cooperating with said stationary contacts to vary the voltage ratio between said exciting winding and said regulating winding, a reversible motor for moving said movable contacts in either of two directions, control means responsive to the output voltage of said regulator to energize said motor, means for rendering said control means inoperable in response to a predetermined position of said movable contacts, a reversing switch for connecting one of the ends of said tapped regulating winding to said exciting winding to fix the polarity of said tapped regulating winding with respect to said exciting winding, a balancing transformer comprising a first coil having $n$ turns connected in series circuit with said first section and a second coil having $$\frac{n}{2}$$

turns connected between said tap changer and a terminal of said apparatus, a double pole double throw type switch operable in one position to connect said sections in series and short circuit said first coil to render said transformer inoperable and operable in another position to connect said sections in parallel and render said transformer operable to cause said parallel connected sections to carry equal currents.

References Cited in the file of this patent

UNITED STATES PATENTS

| | | |
|---|---|---|
| 2,197,253 | Hunter | Apr. 16, 1940 |
| 2,355,998 | Palme | Aug. 15, 1944 |
| 2,435,440 | Graham | Feb. 3, 1948 |
| 2,476,077 | Willis | July 12, 1949 |
| 2,713,126 | Sealey | July 12, 1955 |

FOREIGN PATENTS

| | | |
|---|---|---|
| 412,870 | Germany | Apr. 29, 1929 |